United States Patent
Tsunekawa

(10) Patent No.: US 9,283,910 B2
(45) Date of Patent: Mar. 15, 2016

(54) OBJECT DETECTION APPARATUS AND OBJECT DETECTION METHOD

(75) Inventor: Jun Tsunekawa, Nagoya (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 9 days.

(21) Appl. No.: 13/129,651

(22) PCT Filed: Dec. 9, 2008

(86) PCT No.: PCT/JP2008/003675
§ 371 (c)(1),
(2), (4) Date: May 17, 2011

(87) PCT Pub. No.: WO2010/067397
PCT Pub. Date: Jun. 17, 2010

(65) Prior Publication Data
US 2011/0238309 A1 Sep. 29, 2011

(51) Int. Cl.
*G08G 1/16* (2006.01)
*B60R 21/0134* (2006.01)
*B60R 21/01* (2006.01)

(52) U.S. Cl.
CPC ............ *B60R 21/0134* (2013.01); *G08G 1/165* (2013.01); *G08G 1/166* (2013.01); *B60R 2021/01259* (2013.01); *B60R 2021/01265* (2013.01)

(58) Field of Classification Search
CPC ................. G08G 1/16; B60R 21/0134; B60R 2021/01265; B60R 2021/01259
See application file for complete search history.

(56) References Cited

U.S. PATENT DOCUMENTS

| 5,422,830 A * | 6/1995 | Post | G01S 13/723 348/169 |
| 5,574,463 A * | 11/1996 | Shirai | G01S 7/4802 342/115 |

(Continued)

FOREIGN PATENT DOCUMENTS

| JP | 6 162397 | 6/1994 |
| JP | 2000 3499 | 1/2000 |

(Continued)

OTHER PUBLICATIONS

International Search Report Issued Jan. 13, 2009 in PCT/JP08/003675 filed Dec. 9, 2008.

(Continued)

*Primary Examiner* — John R Olszewski
*Assistant Examiner* — Jean-Paul Cass
(74) *Attorney, Agent, or Firm* — Oblon, McClelland, Maier & Neustadt, L.L.P.

(57) ABSTRACT

Provided is an object detection apparatus and an object detecting method for, with respect to an object detected by a radar, determining whether the object is an automobile and performing an appropriate collision determination based on a determination result. The apparatus comprises a radar device 1 which detects a target in a surrounding area of an own vehicle VM; a target processing section 21 which calculates, with respect to the detected target, information containing at least two of information indicating a position of presence, information indicating a moving direction, and information indicating a moving speed, of the target as target information; and a target determination section 23 which determines, based on the calculated target information, whether a target object is a bicycle depending on whether the target satisfies a predetermined condition, and which determines a risk of collision between the vehicle VM and the target object.

6 Claims, 7 Drawing Sheets

(56) References Cited

U.S. PATENT DOCUMENTS

| | | | | |
|---|---|---|---|---|
| 5,612,883 A * | 3/1997 | Shaffer | ............ | B60K 31/0008 340/435 |
| 6,370,475 B1 * | 4/2002 | Breed | ............ | B60N 2/2863 340/436 |
| 6,400,996 B1 * | 6/2002 | Hoffberg | ............ | G05B 19/0426 370/218 |
| 6,420,997 B1 * | 7/2002 | Cong | ............ | G01S 13/723 342/70 |
| 6,429,804 B1 * | 8/2002 | Kishida | ............ | G01S 13/34 340/435 |
| 6,507,661 B1 | 1/2003 | Roy | | |
| 6,515,614 B2 * | 2/2003 | Sakai | ............ | G01S 15/931 180/167 |
| 6,628,227 B1 * | 9/2003 | Rao | ............ | G01S 13/931 342/70 |
| 6,640,145 B2 * | 10/2003 | Hoffberg | ............ | G05B 19/0426 700/17 |
| 6,766,037 B1 | 7/2004 | Le et al. | | |
| 6,862,527 B2 * | 3/2005 | Okamura | ............ | G01S 7/412 340/435 |
| 7,049,945 B2 * | 5/2006 | Breed | ............ | B60Q 9/008 340/435 |
| 7,100,726 B2 * | 9/2006 | Kim | ............ | G08G 1/166 180/169 |
| 7,130,448 B2 * | 10/2006 | Nagaoka | ............ | G06K 9/00362 340/435 |
| 7,266,453 B2 * | 9/2007 | Sawamoto | ............ | G08G 1/166 340/435 |
| 7,359,555 B2 | 4/2008 | Porikli et al. | | |
| 7,418,346 B2 * | 8/2008 | Breed | ............ | B60N 2/2863 701/117 |
| 7,515,997 B2 * | 4/2009 | Imai | ............ | G08G 1/0104 340/436 |
| 7,592,945 B2 * | 9/2009 | Colburn | ............ | G01C 9/00 342/118 |
| 7,610,146 B2 * | 10/2009 | Breed | ............ | B60N 2/2863 701/300 |
| 7,698,032 B2 * | 4/2010 | Matsumoto | ............ | B60T 8/17557 180/170 |
| 7,777,618 B2 * | 8/2010 | Schiffmann | ............ | G01S 13/878 340/435 |
| 7,840,342 B1 * | 11/2010 | Breed | ............ | G08G 1/161 340/435 |
| 7,911,374 B2 * | 3/2011 | Moriuchi | ............ | G01S 3/48 342/146 |
| 8,060,271 B2 * | 11/2011 | Dolgov | ............ | G05D 1/0246 701/28 |
| 2005/0195383 A1 * | 9/2005 | Breed | ............ | B60N 1/002 356/4.01 |
| 2007/0021915 A1 * | 1/2007 | Breed | ............ | B60N 2/2863 701/301 |
| 2007/0156286 A1 * | 7/2007 | Yamauchi | ............ | G05D 1/0038 700/245 |
| 2007/0280528 A1 * | 12/2007 | Wellington | ............ | G05D 1/0274 382/154 |
| 2008/0033645 A1 | 2/2008 | Levinson et al. | | |
| 2008/0122604 A1 | 5/2008 | Hattori et al. | | |
| 2008/0128546 A1 * | 6/2008 | Olsson et al. | ............ | 244/3.1 |
| 2010/0228482 A1 * | 9/2010 | Yonak | ............ | G01S 3/8083 701/301 |
| 2011/0046843 A1 * | 2/2011 | Caveney | ............ | G08G 1/167 701/31.4 |
| 2011/0098056 A1 * | 4/2011 | Rhoads | ............ | G01C 21/20 455/456.1 |
| 2011/0161076 A1 * | 6/2011 | Davis | ............ | G06F 3/04842 704/231 |
| 2011/0244919 A1 * | 10/2011 | Aller | ............ | G06K 9/00973 455/556.1 |

FOREIGN PATENT DOCUMENTS

| | | |
|---|---|---|
| JP | 2002 157697 | 5/2002 |
| JP | 2006 160116 | 6/2006 |
| JP | 2006 309445 | 11/2006 |
| JP | 2006-315482 | 11/2006 |
| JP | 2007 288460 | 11/2007 |
| JP | 2008 3662 | 1/2008 |
| JP | 2008 132938 | 6/2008 |
| JP | 2008197720 A * | 8/2008 |

OTHER PUBLICATIONS

International Preliminary Report on Patentability Issued on Nov. 17, 2009 in PCT/JP08/003675 filed Dec. 9, 2008.

Office Action dated Feb. 8, 2011, issued in U.S. Appl. No. 12/134,763, filed Jun. 6, 2008.

* cited by examiner

F I G. 1
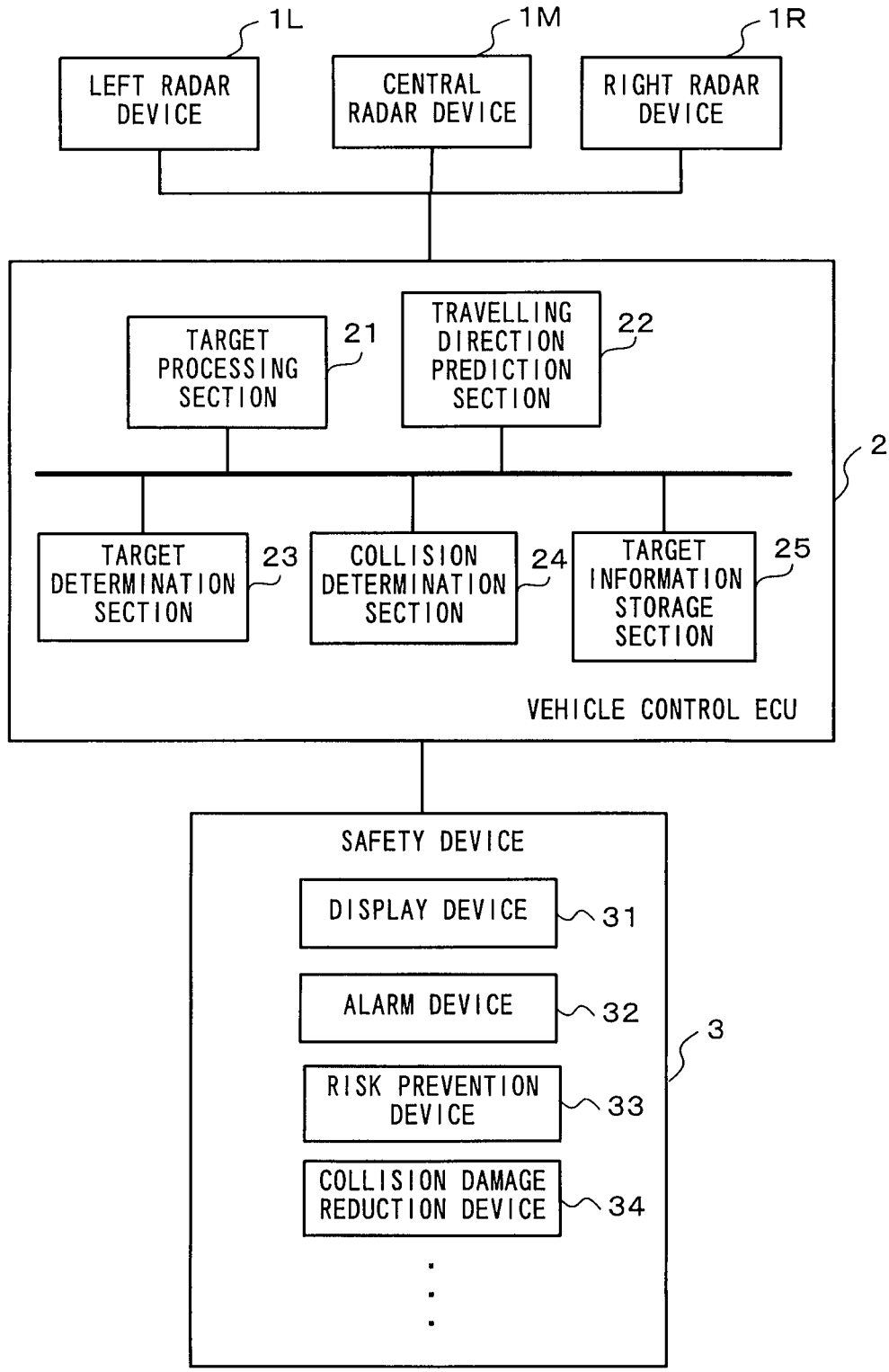

OBJECT DETECTION APPARATUS AND OBJECT DETECTION METHOD

TECHNICAL FIELD

The present invention relates to an object detection apparatus and an object detection method, and more particularly to an object detection apparatus, which is mounted in a vehicle, for detecting an object approaching the vehicle from a surrounding area of the vehicle, and an object detection method.

BACKGROUND ART

Conventionally, there has been known a radar device for vehicles, which is mounted in an own vehicle, for detecting an object approaching the own vehicle from the front direction or a lateral direction. Specifically, the radar device for vehicles detects an object approaching the own vehicle by using a milliwave radar. The radar device for vehicles determines, based on the detection result, a risk of collision between the own vehicle and the object. Further, the radar device for vehicles provides, when it has determined that there is a risk of collision between the own vehicle and the object, a reminder to the driver by means of an alarm device or the like which is provided in the own vehicle.

A general radar device for vehicles recognizes each object approaching an own vehicle from the front direction or a lateral direction as a dot. Accordingly, the type of the object (for example, a vehicle, a bicycle, a pedestrian, or the like) cannot be identified.

As a technology that solves the above problem, there is an apparatus disclosed in Patent Literature 1. The apparatus disclosed in Patent Literature 1 detects objects by means of a radar provided in an own vehicle, and collects objects which are close to one another from among the detected objects as a connected body. Then, when both a moving speed and a moving direction of the connected body are within respective predetermined ranges, the connected body is identified as a pedestrian, a bicycle, or a wheelchair.

[Patent Literature 1] Japanese Laid-Open Patent Publication No. 2006-160116

DISCLOSURE OF THE INVENTION

Problems To Be Solved By the Invention

However, the apparatus disclosed in Patent Literature 1 identifies the type of a plurality of the objects (connected body) detected by the radar, but does not perform a subsequent determination process. In other words, the apparatus disclosed in Patent Literature 1 identifies the object detected by the radar as, for example, a vehicle or a bicycle, but does not determine whether there is a possibility of collision between the identified object and the own vehicle. Accordingly, when the apparatus disclosed in Patent Literature 1 is used to make a prediction of a collision between the identified object and the own vehicle, even if the object is a small object (for example, a bicycle or the like) which can safely pass by the own vehicle, a possibility of collision is determined based on an assumption that the object is an automobile. Consequently, a collision prediction between the object and the own vehicle is made, resulting in an unnecessary reminder (specifically, an alarm or the like).

The present invention has been made in view of the above situation, and an object of the present invention is to provide an object detection apparatus and an object detecting method which can determine whether an object having been detected by a radar is an automobile and properly determine a possibility of collision based on a result of the determination whether the object is an automobile.

Solution to the Problems

In order to solve the above problem, the present invention has the following features.

A first aspect of the present invention is directed to an object detection apparatus which is mounted in a vehicle and detects an object in a surrounding area of the vehicle, the apparatus including: a detection part which detects an object in the surrounding area of the vehicle; a processing part which calculates, with respect to the object detected by the detection part, information containing at least two of information indicating a position of presence of the object, information indicating a moving direction of the object, and information indicating a moving speed of the object, as target information; and a determination part which determines, based on the target information calculated by the processing part, whether the object is a movable body other than an automobile depending on whether the object satisfies a predetermined condition, and which determines, when a result of the determination is that the object is the movable body, a risk of collision between the movable body and the vehicle by using a criterion based on an assumption that the object is the movable body.

In a second aspect of the present invention based on the first aspect, the processing part calculates, as the target information, the information containing at least the information indicating the position of presence of the object and the information indicating the moving direction of the object, and the determination part determines, when the determination part has determined that the position of presence of the object indicated by the target information is within a set area to a side of the vehicle and the moving direction indicated by the target information is a direction toward the vehicle, that the object is the movable body.

In a third aspect of the present invention based on the second aspect, the processing part further calculates the information indicating the moving speed of the object as the target information, and the determination part determines, when the determination part has determined that the position of presence of the object indicated by the target information is within the set area to a side of the vehicle; that the moving direction indicated by the target information is the direction toward the vehicle; and that the moving speed indicated by the target information is smaller than or equal to a predetermined value, that the object is the movable body.

In a fourth aspect of the present invention based on the second aspect, the set area is set to a left side of the vehicle when the vehicle is destined for a country where automobiles drive on the left-hand side of the road.

In a fifth aspect of the present invention based on the second aspect, the set area is set to a right side of the vehicle when the vehicle is destined for a country where automobiles drive on the right-hand side of the road.

In a sixth aspect of the present invention based on the second aspect, the set area is set a first distance apart from a side portion of the vehicle.

In a seventh aspect of the present invention based on the first aspect, the determination part determines, when the determination part has determined that the object is the movable body based on the target information calculated by the processing part, a risk of collision between the movable body as a dot and the vehicle as a figure having a predetermined size.

In an eighth aspect of the present invention based on the second aspect, the processing part further calculates a travelling direction of the vehicle based on vehicle information obtained from the vehicle, and the determination part, when the determination part has determined that a straight line extended, based on the information indicating the moving direction contained in the target information, in the moving direction of the object does not intersect with a straight line extended in the travelling direction; and that the position of presence of the object is within the set area based on the information indicating the position of presence contained in the target information, determines that the object having been determined to be the movable body does not collide with the vehicle.

In a ninth aspect of the present invention based on the second aspect, the determination part determines, when the determination part has determined that the position of presence of the object is within a second distance from the side portion of the vehicle based on the target information which has been calculated by the processing part and which contains at least the information indicating the position of presence of the object, that there is a risk of collision between the movable body and the vehicle.

In a tenth aspect of the present invention based on either the sixth aspect or the ninth aspect, the first distance and the second distance are set in accordance with a width of the movable body.

In an eleventh aspect of the present invention based on the first aspect, the determination part accumulates, when the determination part has determined that the object is the movable body, the number of times when a determination is made that there is no risk of collision between the movable body and the vehicle by using the criterion and determines, when the accumulated number has reached a predetermined number, that the object having been determined to be the movable body does not collide with the vehicle.

In a twelfth aspect of the present invention based on the first aspect, the determination part transmits, when the determination part has determined that the object is the movable body and that there is a high risk of collision between the movable body and the vehicle, the target information to a collision determination part which performs at least one of a collision risk prevention operation and a collision damage reduction operation, the target information being a criterion for determining to cause the collision determination part to perform, with respect to the movable body, at least one of the collision risk prevention operation and the collision damage reduction operation.

A thirteenth aspect of the present invention is an object detection method which is provided in a vehicle and detects an object in a surrounding area of the vehicle, the method including: a detection step of detecting an object in the surrounding area of the vehicle; a processing step of calculating, with respect to the object detected in the detection step, information containing at least two of information indicating a position of presence of the object, information indicating a moving direction of the object, and information indicating a moving speed of the object as target information; and a determination step of determining, based on the target information calculated in the processing step, whether the object is a movable body other than an automobile depending on whether the object satisfies a predetermined condition; and of determining, when a result of the determination is that the object is the movable body, a risk of collision between the movable body and the vehicle by using a criterion based on an assumption that the object is the movable body.

Advantageous Effects of the Invention

According to the first aspect, it can be determined whether the object detected by the detection part is the movable body other than an automobile, that is, whether the object is a bicycle, a pedestrian, a wheelchair or the like. Further, a possibility of collision between the movable body and the vehicle can be determined by using a criterion based on an assumption that the detected object is the movable body. Accordingly, in the case of a small object (such as a bicycle which is smaller than an automobile) which can safely passes by the vehicle, a possibility of collision can be determined based on an assumption that the detected object is a small object. Thus, a collision prediction between the small object and the vehicle is made, resulting in prevention of unnecessary alarms or the like.

According to the second aspect, the determination part can determine, through a simple process, that the object which is approaching from the set area provided to the side of the vehicle is the movable body (such as a bicycle, a pedestrian, a wheelchair, or the like) other than an automobile.

According to the third aspect, the determination part can determine, through a simple process, the object which is approaching at a low speed from the set area provided to the side of the vehicle is the movable body other than an automobile.

According to the fourth aspect, in accordance with a roadway environment where the vehicle in which the object detection apparatus is mounted is used, an area to a side of the vehicle is determined as the set area. Accordingly, in a country (Japan, for example) where automobiles drive on the left-hand side, by setting an area to a left of the vehicle as the set area, the object which is approaching from the set area can be correctly determined as the movable body other than an automobile.

According to the fifth aspect, in accordance with a roadway environment where the vehicle in which the object detection apparatus is mounted is used, an area to a side of the vehicle is determined as the set area. Accordingly, in countries (such as the USA, Europe and the like) where automobiles drive on the right-hand side, by setting an area to a right of the vehicle as the set area, the object which is approaching from the set area can be correctly determined as the movable body other than an automobile.

According to the sixth aspect, the set area is set a predetermined distance apart from the side portion of the vehicle. Thus, for example, in the case of the object which is likely to contact with the side portion of the vehicle, it can be determined that there is a risk of collision between the object and the vehicle.

According to the seventh aspect, when the object has been determined to be the movable body other than an automobile, the movable body is regarded as a dot, and a possibility of collision between the dot and the vehicle is determined. This eliminates the necessity of performing a process to be performed based on an assumption that the detected object is a size of an automobile, thereby allowing a possibility of collision to be determined based on an assumption that the detected object is smaller than an automobile. With this, a prediction of collision can be made based on an assumption that the object is an object such as a bicycle which is relatively small when compared to an automobile.

According to the eighth aspect, for example, the object can be determined to be the movable body other than an automobile, which can safely pass by the own vehicle. In other words, the movable body other than an automobile can be determined to be a bicycle, a pedestrian, a wheelchair, or the like, which is safely passing by on a side strip.

According to the ninth aspect, when the movable body is present within a predetermined distance from the side portion of the vehicle, it is determined that the movable body is likely to collide with the vehicle. In other words, when determining a possibility of collision, even if the movable body is running in parallel with the vehicle (that is, when the moveable body can pass by the vehicle in parallel), it can be determined that the movable body is likely to contact with the side portion of the vehicle if the movable body is very close to the vehicle.

According to the tenth aspect, as the predetermined distance, the first distance and the second distance can be set by taking into consideration a width of the movable body other than an automobile, which is, specifically, a bicycle, a pedestrian, a wheelchair, or the like.

According to the eleventh aspect, the determination part can more accurately determine that the object is the movable body other than an automobile which has a low risk of collision with the vehicle.

According to the twelfth aspect, the determination part transmits, to the collision determination part, the target information of the movable body other than an automobile which has a high risk of collision with the vehicle. Accordingly, a driver of the vehicle can be informed of a presence of the movable body which has a high risk of collision with the vehicle by the operations performed by the collision determination part (the collision risk prevention operation, the collision damage reduction operation), thereby avoiding the risk of collision.

The object detecting method according to the present invention can obtain the same effect as that of the above described object detection apparatus according to the present invention.

BRIEF DESCRIPTION OF THE DRAWINGS

FIG. 1 is a block diagram showing a configuration of a driver support system.

DESCRIPTION OF THE REFERENCE CHARACTERS

Figure 2:
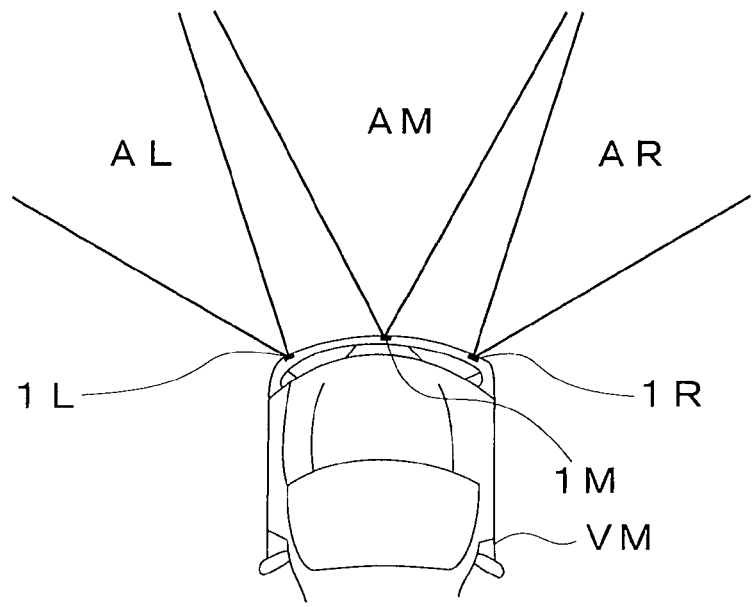
FIG. 2 shows an example of a mounting position of a radar device 1.

1L . . . left radar device
1M . . . central radar device
1R . . . right radar device
2 . . . vehicle control ECU
21 . . . target processing section
22 . . . travelling direction prediction section
23 . . . target determination section
24 . . . collision determination section
25 . . . target information storage section
3 . . . safety device
31 . . . display device
32 . . . alarm device
33 . . . risk prevention device
34 . . . collision damage reduction device

BEST MODE FOR CARRYING OUT THE INVENTION

In the following, an object detection apparatus according to an embodiment of the present invention will be described with reference to the drawings. In the present embodiment, description will be made of a case in which a driver support system DSS (Driver Support System) which includes the object detection apparatus is provided in a vehicle (hereinafter, referred to as an own vehicle VM).

FIG. 1 is a block diagram showing a configuration of the driver support system. As shown in FIG. 1, the driver support system includes a left radar device 1L, a central radar device 1M, a right radar device 1R, a vehicle control ECU (Electrical Control Unit) 2, and a safety device 3.

The left radar device 1L is provided in a predetermined position (for example, the left side of the front portion of the own vehicle VM in which a headlight or a blinker is mounted) of the own vehicle VM. The left radar device 1L radiates an electromagnetic wave outwardly from the own vehicle VM, and monitors a surrounding area in front of the own vehicle VM. As shown in FIG. 2, the left radar device 1L radiates an electromagnetic wave diagonally leftward from the own vehicle VM, and detects a target (such as an other vehicle, a bicycle, a pedestrian, a building, or the like) which is present within a detection range (AL in FIG. 2) of the left radar device 1L.

The central radar device 1M is provided in a predetermined position (for example, the center of the front portion) of the own vehicle VM and radiates an electromagnetic wave outwardly from the own vehicle VM, and monitors a surrounding area in front of the own vehicle VM. As shown in FIG. 2, for example, the central radar device 1M radiates an electromagnetic wave forward from the own vehicle VM, and detects a target (such as an other vehicle, a bicycle, a pedestrian, a building, or the like) which is present within a detection range (AM in FIG. 2) of the central radar device 1M.

The right radar device 1R is provided in a predetermined position (for example, the right side of the front portion of the own vehicle VM in which a headlight or a blinker is mounted) of the own vehicle VM and radiates an electromagnetic wave outwardly from the own vehicle VM, and monitors a surrounding area in front of the own vehicle VM. As shown in FIG. 2, for example, the right radar device 1R radiates an electromagnetic wave diagonally rightward from the own vehicle VM, and detects a target (such as an other vehicle, a bicycle, a pedestrian, a building, or the like) which is present within a detection range (AR in FIG. 2) of the right radar device 1R.

Specifically, the left radar device 1L, the central radar device 1M, and the right radar device 1R each radiates an electromagnetic wave, and receives a reflected wave of the radiated electromagnetic wave. Each radar device detects, for example, a target present in a surrounding area in front of the own vehicle, and outputs a signal obtained by detecting the target to a vehicle control ECU 2. Further, each radar device outputs a signal for each detected target. When a plurality of target objects are detected by each radar device, with respect to each of the detected plurality of target objects, each radar device outputs a signal obtained by detecting a target to the vehicle control ECU 2.

The radar devices are not limited to those in the example shown in FIG. 2. For example, only the right radar device 1R and the left radar device 1L may monitor the surrounding area in front of the own vehicle VM, or only the central radar device 1M may monitor the surrounding area in front of the own vehicle VM. In short, one or more radar devices may be used to monitor a targeted direction in the surrounding area of the own vehicle VM.

Each radar device has the same configuration except that a radiation direction of electromagnetic wave is different. Therefore, in the following description, unless the left radar device 1L, the central radar device 1M, and the right radar device 1R are separately referred to, each of those radar devices is simply referred to as a "radar device 1." The radar device 1 corresponds to an example of the detection part defined in the claims.

Returning to FIG. 1, as shown in FIG. 1, the vehicle control ECU 2 is an information processing device which includes a target processing section 21, a travelling direction prediction section 22, a target determination section 23, a collision determination section 24, a target information storage section 25, an interface circuit, and the like.

The target processing section 21 calculates, based on a signal received from the radar device 1, target information such as information indicating a position, information indicating a speed, information indicating a distance, and the like of a target with respect to the own vehicle VM. For example, based on a sum of and a difference between an electromagnetic wave radiated from the radar device 1 and a reflected wave received by the radar device 1, transmission and reception timings, and the like, the target processing section 21 calculates a relative distance, a relative speed, a relative position, and the like of the target with respect to the own vehicle VM. The target processing section 21 outputs, as target information iL, information containing information indicating a relative distance, information indicating a relative speed, information indicating a relative position, and the like of the target with respect to the left radar device 1L to the travelling direction prediction section 22.

Likewise, also with respect to the central radar device 1M and the right radar device 1R, the target processing section 21 calculates, based on a signal obtained by each of the respective radar device 1M and the radar device 1R detecting a target, a relative distance, a relative speed, a relative position, and the like of the target with respect to the own vehicle VM. Then, the target processing section 21 outputs, as target information iM, information containing a relative distance, a relative speed, a relative position, and the like of the target with respect to the central radar device 1M to the travelling direction prediction section 22. The target processing section 21 outputs, as target information iR, information containing a relative distance, a relative speed, a relative position, and the like of the target with respect to the right radar device 1R to the travelling direction prediction section 22. The target processing section 21 corresponds to an example of the processing part defined in the claims.

Further, the target processing section 21 performs a process of converting a position of each target detected by the radar device 1 into a coordinate system with its origin at a predetermined position of the own vehicle VM. Here, with reference to an example of the left radar device 1L, the coordinate conversion process will be briefly described.

When the left radar device 1L detects a target and the vehicle control ECU 2 performs a process based on a signal outputted from the left radar device 1L, a position of the target is calculated using a coordinate system with its origin at the mounting position of the left radar device 1L (processing is the same for the central radar device 1M and the right radar device 1R). Then, in order to make the condition the same for each target outputted from the radar device 1, the target object processing section 21 performs a process of converting a position of the target into a position in a coordinate system with its origin at a predetermined position of the own vehicle VM. The target processing section 21 may perform the coordinate conversion process based on a previously obtained width of the own vehicle VM, a mounting position, a mounting angle, and the like of the left radar device 1L in the own vehicle VM.

Although details will be described later, the travelling direction prediction section 22 predicts, based on the target information outputted from the target processing section 21, a travelling direction of the target object (predicts a path which the target object will follow toward the own vehicle VM). Further, the travelling direction prediction section 22 predicts, based on a vehicle speed, a yaw rate, or the like of the own vehicle VM, a travelling direction of the own vehicle VM (predicts a path which the own vehicle VM will follow).

Based on the travelling direction of the target object and the travelling direction of the own vehicle VM, which have been predicted by the travelling direction prediction section 22, the target determination section 23 determines whether the target object detected by the radar device 1 is a bicycle or the like (a movable body other than an automobile) which is not likely to collide with the own vehicle VM. The travelling direction prediction section 22 and the target determination section 23 correspond to an example of the determination part defined in the claims.

Based on the information outputted from the target processing section 21 and the target determination section 23, the collision determination section 24 determines whether the own vehicle VM is likely to collide with the target object. For example, the collision determination section 24 calculates, with respect to each target object, a predicted time to collision between the own vehicle VM and the target object, that is, TTC (time to collision). Then, based on a result of the calculation, when the calculated TTC is shorter than a predetermined time period, the collision determination section 24 gives an instruction to the safety device 3 and causes the safety device 3 to take the below described safety measures. The TTC can be obtained, for example, by dividing the relative distance by the relative speed (TTC=relative distance/relative speed).

The target information storage section 25 is a storage medium which temporarily stores the target information generated by the target processing section 21. The target information storage section 25 stores the target information generated by the target processing section 21 in chronological order.

The radar device 1 may perform the processes performed by the vehicle control ECU 2 within itself. For example, when a plurality of radar devices are provided in the own vehicle VM, all signals outputted from the radar device 1 are collected to the vehicle control ECU 2. Accordingly, for example, if the left radar device 1L performs the processes to be performed by the vehicle control ECU 2 within itself, it is possible to perform processes only on the targets detected by the left radar device 1L, thereby reducing the processing load when compared to that in an embodiment where all signals outputted from the radar devices are collected to the vehicle control ECU 2.

When there is a high risk of collision with the target object, in accordance with an instruction from the collision determination section 24, the safety device 3 provides the driver of the own vehicle VM with a reminder. Further, the safety device 3 includes various devices which conduct, when a collision with the target object cannot be avoided, so-called passenger protection and alleviation of collision conditions in order to reduce damages to a passenger of the own vehicle VM. Hereinafter, the collision risk prevention operation and the collision damage reduction operation conducted by the safety device 3 are collectively referred to as safety measures.

Here, an example of devices included in the safety device 3 will be described. As shown in FIG. 1, the safety device 3 includes, for example, a display device 31 such as a warning lamp, and an alarm device 32 such as a warning buzzer. Further, the safety device 3 includes a risk prevention device 33 which assists brake operation performed by the driver of the own vehicle VM in order to avoid collision with the target object, and a collision damage reduction device 34 which restrains the passenger of the own vehicle VM to his/her seat and reduces collision damages by rewinding the seat belt or causing the seat to move. Further, the collision damage reduction device 34 causes the air bag to inflate, and also moves the seat to a position to be ready for a collision. The devices included in the safety device 3 are only examples and not limited thereto.

A general radar device for vehicles which detects an object in a surrounding area of an own vehicle assumes that a detection target is an automobile (hereinafter referred to as an other vehicle). Therefore, when the radar device for vehicles detects an object, the radar device generally performs a process based on an assumption that the object is an other vehicle. Specifically, the radar device for vehicles detects an object as a dot, assumes that the detected dot is a size of an automobile, and then determines a risk of collision between the dot and the own vehicle VM. In other words, even when an object which is smaller than the other vehicle is detected, the general radar device performs a process based on an assumption that the detected object is a size of an automobile.

Figure 3:
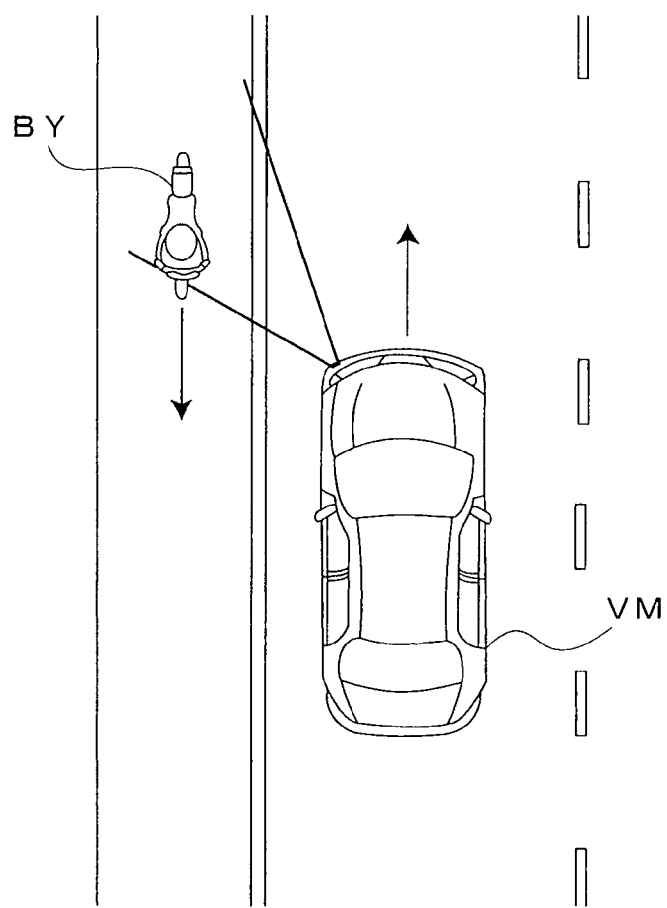
FIG. 3 shows a typical road in Japan.

FIG. 3 shows a typical road in Japan. As shown in FIG. 3, for example, it is assumed that an own vehicle VM is running on the left-hand side of the road, and a bicycle BY is safely running in a direction oppose to that of the own vehicle VM on a side strip to the left side of the road when seen from the own vehicle VM. In this case, the own vehicle VM and the bicycle BY run in the directions indicated by respective arrows as shown in FIG. 3, that is, in the travelling directions parallel to each other. Accordingly, it can be considered that the own vehicle VM and the bicycle BY can safely pass by without colliding with each other.

In a scene like this, it is assumed that the general radar device for vehicles detects the bicycle BY. As described above, the general radar device for vehicles detects the object (bicycle BY) as a dot, and then performs a process based on an assumption that the detected dot is the size of an automobile. Thus, even in the case shown in FIG. 3 where the own vehicle VM and the bicycle BY can safely pass by each other, the radar device for vehicles determines that there is a possibility of collision between the own vehicle VM and the bicycle BY, resulting in unnecessary safety measures. In other words, even though the bicycle BY is smaller than an automobile, the radar device for vehicles assumes that the bicycle BY is the size of an automobile, and may determine that there is a possibility of collision between the bicycle BY and the own vehicle VM.

What is more, in a roadway environment in Japan where vehicles run on the left-hand side of the road, an object approaching the own vehicle VM from the left forward direction of the own vehicle VM is, in most situations, an object such as a bicycle or a pedestrian which is relatively small when compared to an other vehicle (automobile). Accordingly, as described above, this often results in unnecessary safety measures taken by the general radar device for vehicles.

In view of the above, when the radar device 1 detects an object, if a moving pattern of the object satisfies a predetermined condition, the target determination section 23 determines that the object is a bicycle which is safely running. Then, the target determination section 23 determines that the object is an object which does not require safety measures, thereby preventing unnecessary safety measures from being taken. The following will describe an operation of the vehicle control ECU 2 with reference to flow charts.

Figure 4:
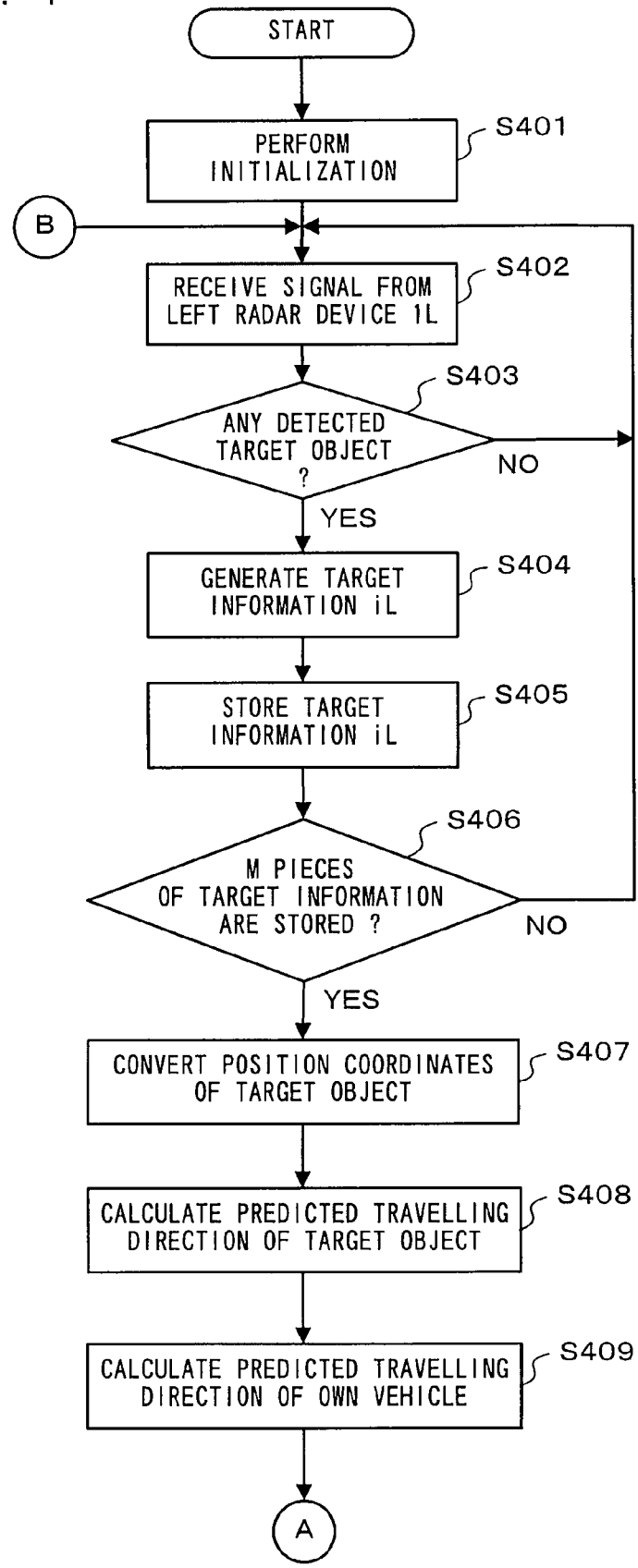
FIG. 4 is a flow chart showing an example of the former part of processing performed in sections of a vehicle control ECU 2 of an object detection apparatus according to the present embodiment.
Figure 5:
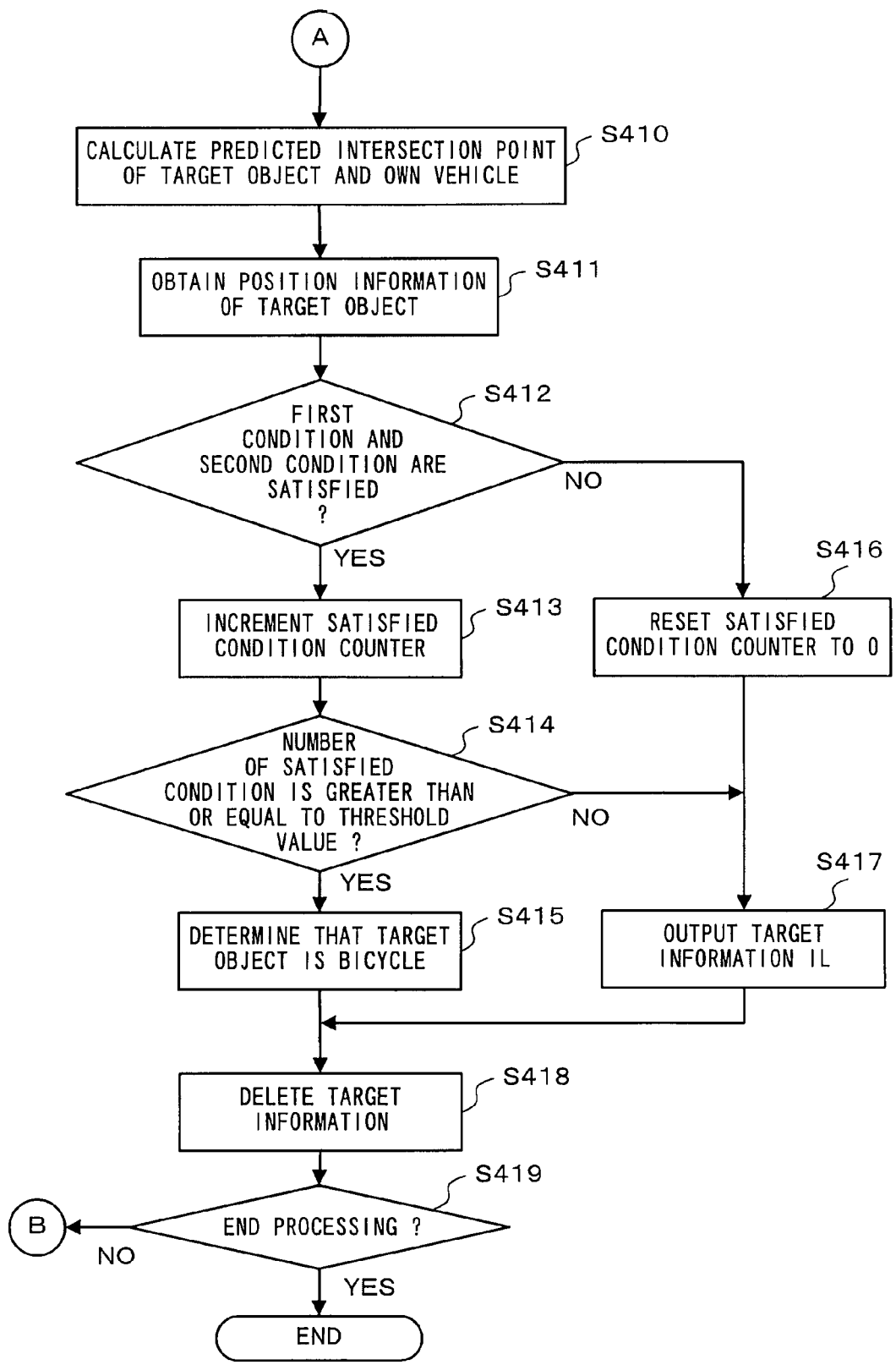
FIG. 5 is a flow chart showing an example of the latter part of the processing performed in the sections of the vehicle control ECU 2 of the object detection apparatus according to the present embodiment.

With reference to FIGS. 4 to 5, the following will describe an example of operations performed in sections of the vehicle control ECU 2 according to the present embodiment. In the following, the left radar device 1L is used as an example to assume, in the roadway environment in Japan, a case in which the vehicle control ECU 2 performs a process with respect to a target detected by the left radar device 1L.

FIG. 4 is a flow chart showing an example of the former part of processing performed in sections of the vehicle control ECU 2 of the object detection apparatus according to the present embodiment, while FIG. 5 is a flow chart showing an example of the latter part of the processing. Processes of the flow charts shown in FIG. 4 and FIG. 5 are caused to be performed when the vehicle control ECU 2 executes a predetermined program provided thereto. Further, the program for causing the processes shown in FIG. 4 and FIG. 5 to be performed is previously stored in, for example, a storage area of the vehicle control ECU 2. When the power of the vehicle control ECU 2 is turned ON, (for example, when the driver of the own vehicle VM has performed an operation for starting a process to cause the processes to be performed, when the ignition switch of the own vehicle VM is turned ON, or the like), the processes of the flow charts shown in FIG. 4 and FIG. 5 are performed by the vehicle control ECU 2.

In step S401 of FIG. 4, the target processing section 21 performs an initialization. Specifically, as will be apparent from the following description, if target information is stored in the target information storage section 25, the target processing section 21 deletes the target information and clears a satisfied condition counter if the counter is not cleared.

In step S402, the target processing section 21 receives, from the left radar device 1L, a signal which the left radar device 1L has obtained by detecting a target, thereby proceeding the processing to step S403. When the left radar device 1L has not detected a target (specifically, when there is no target present in a surrounding area in front of the own vehicle VM), the left radar device 1L outputs a signal indicating that there is 0 target (no target) to the target processing section 21.

In step S403, the target processing section 21 determines whether there is any target detected by the left radar device 1L. Specifically, the target processing section 21 determines, based on the signal received from the left radar device 1L in the above step S402, whether there is any target detected by the left radar device 1L. Then, when a result of the determination by the target processing section 21 is affirmative (YES), the target processing section 21 proceeds the processing to step S404. Meanwhile, when the result of the determination is negative (NO), the target processing section 21 returns the processing to step S402 to receive another signal. In other words, unless the left radar device 1L actually detects a target, the target processing section 21 cannot proceed the processing to step S404. When the left radar device 1L has not detected the target, the target processing section 21 returns the processing to step S402.

In step S404, the target processing section 21 generates target information iL with respect to the target based on the signal received from the left radar device 1L. Specifically, based on the signal received from the left radar device 1L, the target processing section 21 generates, as the target information iL, information containing such as a relative distance, a relative speed, and a relative position of the target with respect to the left radar device 1L. Then, the target processing section 21 proceeds the processing to the following step S405.

In step S405, the target processing section 21 causes the target information storage section 25 to temporarily store the target information iL generated with respect to the target in step S404 in chronological order. Then, the target processing section 21 proceeds the processing to the following step S406.

As will be apparent from the following description, specifically in the process in step S405, the travelling direction prediction section 22 requires, in order to predict a travelling direction of the target object, a plurality of pieces of the target information iL including the latest target information iL with respect to the target object. Accordingly, the target processing section 21 is required to cause the target information storage section 21 to temporarily store at least a predetermined number of pieces (hereinafter, referred to as M pieces) of the target information iL with respect to the target object in chronological order.

In step S406 of FIG. 4, the target processing section 21 determines whether M pieces of the target information are stored in the target information storage section 25. In other words, the target processing section 21 determines whether at least M pieces of the target information in chronological order including the latest target information iL with respect to the same target object have been obtained.

Then, when a result of the determination is affirmative (YES), the target processing section 21 proceeds the processing to the following step S407. Meanwhile, when the result of the determination is negative (NO), the target processing section 21 returns the processing to step S402. In other words, the target processing section 21 repeats, until at least M pieces of the target information iL are stored in the target information storage section 25, the processes of receiving a signal from the left radar device 1L through to generating the target information iL.

As described above, by repeating the processes of steps S402 to S406, the target processing section 21 can obtain a history of at least M pieces of the target information iL in chronological order. Then, the target processing section 21 causes the target information storage section 25 to store the target information iL in chronological order.

Figure 6:
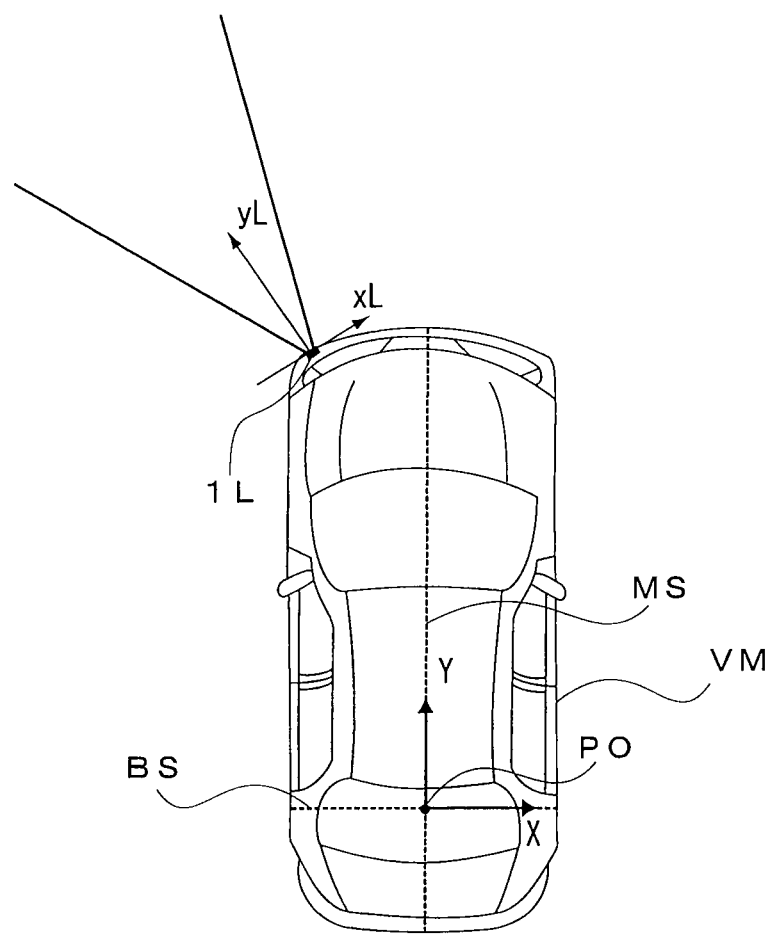
FIG. 6 shows a coordinate system (xL, yL) with its origin at a mounting position of a left radar device 1L, and a coordinate system (X, Y) with its origin at a center PO of a rear axle of an own vehicle VM.

In step S407, the target processing section 21 performs, with respect to each of the targets which are currently stored in the target information storage section 25, a process of converting position coordinates based on a corresponding piece of the target information iL. With reference to FIG. 6, a coordinate conversion process performed by the target processing section 21 in step S407 will be described.

FIG. 6 shows a coordinate system (xL, yL) with its origin at a mounting position of the left radar device 1L, and a coordinate system (X, Y) with its origin at a center PO of a rear axle of an own vehicle VM. In FIG. 6, position information of the target included in the target information iL is represented by a coordinate system with its origin at the mounting position of the left radar device 1L. In other words, the position information contained in the target information iL is processed in the target processing section 21 as a value represented by the coordinate system (xL, yL) with its origin at the mounting position of the left radar device 1L. Here, the target processing section 21 performs, in order to make a subsequent process simple, the coordinate conversion process so that the coordinate system (xL, yL) of the left radar device 1L is converted to the coordinate system (X, Y) with its origin at a center PO of the rear axle of the own vehicle VM. In the coordinate system (X, Y) with its origin (0,0) at the center PO of the rear axle of the own vehicle VM, a Y-axis represents a center shaft MS of the own vehicle VM, an X-axis represents a rear axle BS, and respective arrows indicate positive directions of the X-axis and the Y-axis.

In the following description, the target information iL after the coordinate conversion process has been performed is referred to as target information IL. The target processing section 21 proceeds the processing to the following step S408, which is the subsequent process of the coordinate conversion process in step S407.

In step S408, the travelling direction prediction section 22 predicts a travelling direction of the target object detected by the left radar device 1L. In the following, with reference to FIG. 7, a process performed by the travelling direction prediction section 22 in step S408 will be described in detail.

Figure 7:
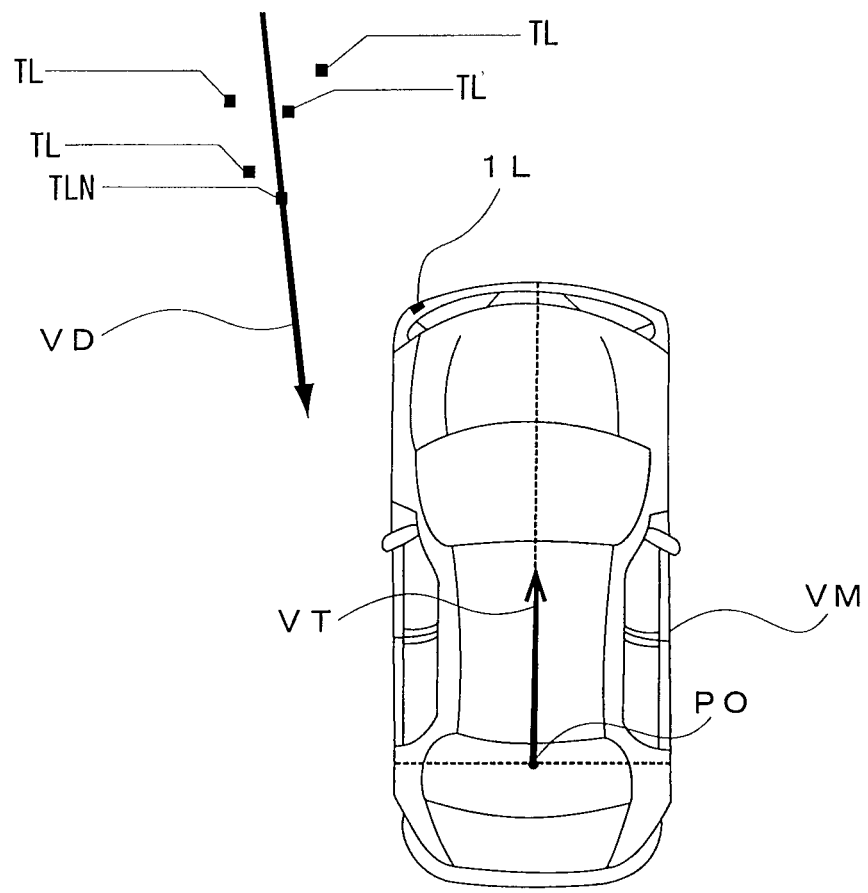
FIG. 7 shows a detection status of a target object, which is stored in a target information storage section 25.

FIG. 7 shows a part of a detection status of the target object stored in the target information storage section 25. For the sake of simple explanation, here as an example, five is the number of pieces (corresponding to M pieces in step S406) of the target information iL required when the travelling direction prediction section 22 predicts the travelling direction of the target object.

As shown in FIG. 7, as an example, as a portion of the target information stored in the target information storage section 25, five targets (TL) are shown. Among the targets shown in FIG. 7, the latest target is represented by a target TLN.

The travelling direction prediction section 22 calculates, based on a portion of the target information IL of the target object (including the latest target) stored in the target information storage section 25, a predicted travelling direction VD of the target object.

For example, based on the target information IL stored in the target information storage section 25, the travelling direction prediction section 22 plots a dot in the coordinate system (X, Y) with its origin at the center PO of the rear axle of the own vehicle VM, with respect to a position of each target detected by the left radar device 1L (see FIG. 7). Then, the travelling direction prediction section 22 calculates a slope of an approximate straight line of the respective dots by the least-squares method. Further, the travelling direction prediction section 22 calculates a straight line which passes through the latest target (specifically, the dot representing the target TLN) and which has the above slope, and obtains the straight line as a predicted travelling direction VD.

Returning to FIG. 4, in step S409, the travelling direction prediction section 22 calculates a predicted travelling direction VT of the own vehicle VM (see FIG. 7). For example, the travelling direction prediction section 22 calculates, based on information obtained from the speed sensor, the yaw rate sensor, the lateral acceleration sensor, and the like which are provided in the own vehicle VM, a direction in which the own vehicle VM travels, that is, a predicted travelling direction VT of the own vehicle VM. When the own vehicle VM is running straight ahead, for example, the predicted travelling direction VT of the own vehicle VM is a direction along the Y-axis in the coordinate system with its origin at the center PO of the rear axle of the own vehicle VM. In other words, the own vehicle VM has a direction vector in the Y-axis direction.

On the other hand, when the driver of the own vehicle VM performs steering operation to turn the own vehicle VM (when the own vehicle VM is turning), the predicted travelling direction VT of the own vehicle VM can be calculated based on information obtained from the speed sensor, the yaw rate sensor, the lateral acceleration sensor, and the like. A method for calculating the predicted travelling direction VT of the own vehicle VM when the own vehicle VM is turning, may be a known method. For example, the predicted travelling direction VT of the own vehicle VM when the own vehicle VM is turning may be a tangential direction of a turning circle which is drawn when the own vehicle VM turns. In general, with respect to the turning circle which the gravity center of the own vehicle draws when the own vehicle is turning, an instantaneous moving direction of the own vehicle VM when turning can be represented by a tangential direction at a position of the turning circle at which the gravity center of the own vehicle VM is currently located. For the sake of simple explanation, the following will describe, as an example, a case in which the own vehicle VM is running straight ahead (the predicted travelling direction VT is the direction along the Y-axis in the coordinate system with its origin at the center PO of the rear axle of the own vehicle VM, that is, the own vehicle VM has the direction vector in the Y-axis direction.

Figure 8:
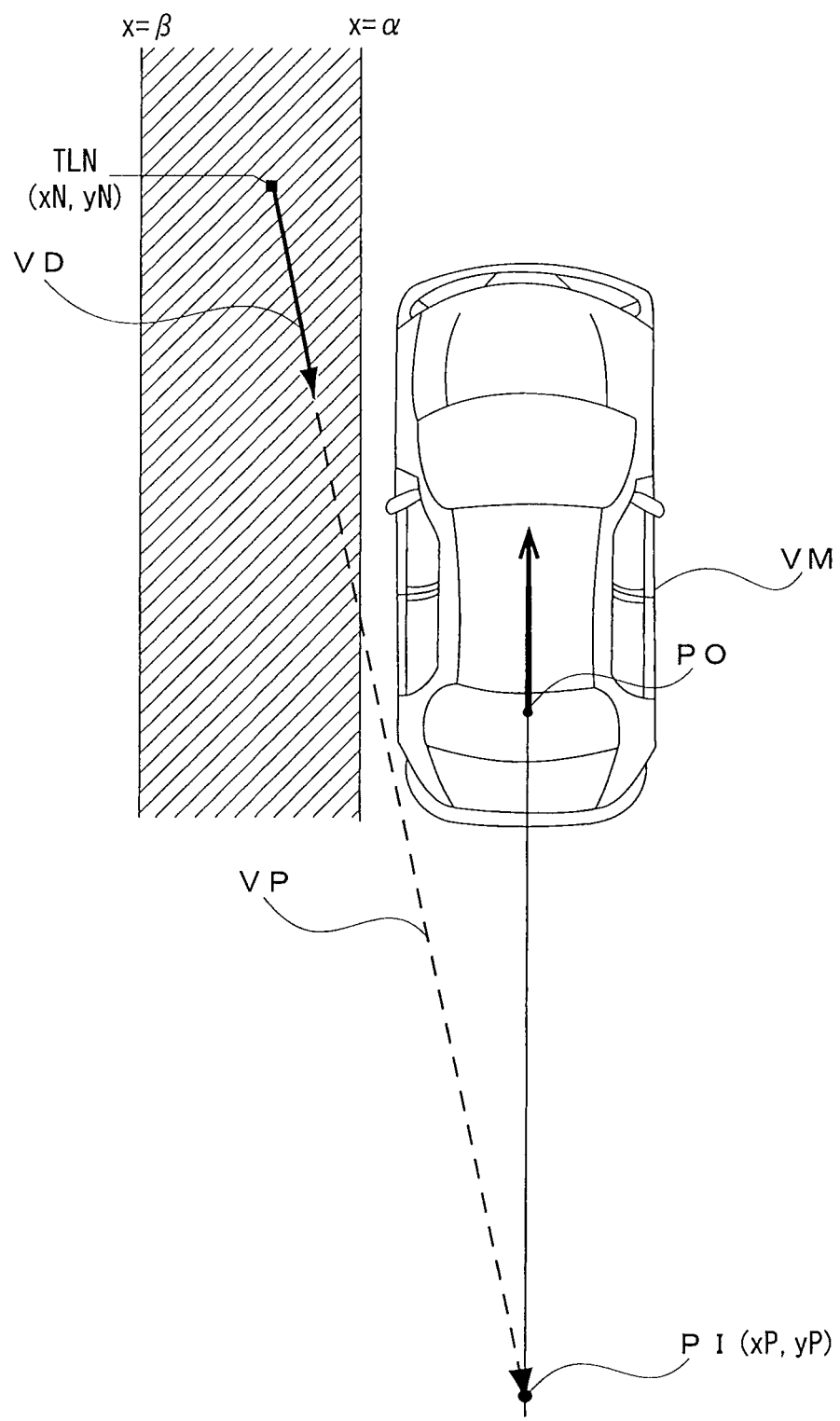
FIG. 8 shows a relationship between a predicted travelling direction VD of the target object and a predicted travelling direction VT of the own vehicle VM.

Next, a flow chart in FIG. 5 will be described. In step S410 which is a process following the process (step S409) of calculating the predicted travelling direction VT of the own vehicle VM, the target determination section 23 calculates, based on the predicted travelling direction VD of the target object (the above step S408) and the predicted travelling direction VT of the own vehicle VM (the above step S409), a predicted intersection point of the target object and the own vehicle VM. With reference to FIG. 8, the following will describe the predicted intersection point of the target object and the own vehicle VM.

FIG. 8 shows a relationship between the predicted travelling direction VD of the target object and the predicted travelling direction VT of the own vehicle VM. As shown in FIG. 8, the target object is predicted to travel in the direction indicated by the arrow of the predicted travelling direction VD. In other words, the target object is predicted to travel over time in the direction indicated by the dashed line in FIG. 8 (hereinafter, referred to as a predicted destination direction VP).

The target determination section 23 calculates, in the coordinate system with its origin at the center PO of the rear axle of the own vehicle VM, an intersection point PI (xP, yP) of a straight line indicating the predicted destination direction VP and a line indicating the predicted travelling direction VT of the own vehicle VM. It is noted that when the predicted travelling direction VD of the target object is parallel to the predicted travelling direction VT of the own vehicle VM, a predicted intersection point cannot be calculated. In such a case, the target determination section 23 determines that there is no predicted intersection point. Then, the target determination section 23 proceeds the processing to the following step 5411.

In step S411, the target determination section 23 obtains, with reference to the target information IL stored in the target information storage section 25, information indicating a position where the target is present in the coordinate system with its origin at the center PO. Specifically, the travelling direction prediction section 22 obtains, with respect to the target TLN which is the latest among the targets detected by the left radar device 1L, position information of the latest target. More specifically, the target determination section 23 obtains the position information of the target TLN by referring to the target information IL of the target TLN stored in the target information storage section 25. As shown in FIG. 8, the position of the target TLN is represented by (xN, yN) in the coordinate system with its origin at the center PO. Then, the target determination section 23 proceeds the processing to the following step S412.

In step S412, the target determination section 23 determines, based on the predicted intersection point calculated in the above step S410 and the position information of the target obtained in the above step S411, whether a condition is satisfied to assume that the target object is a bicycle. Specifically, when a first condition and a second condition below are satisfied, the target determination section 23 makes an affirmative determination (YES).

First condition: "no predicted intersection point, or a predicted intersection point is behind the own vehicle VM."
Second condition: "the lateral location of the target is present within a predetermined range."

First, the first condition is that there is no predicted intersection point or that a predicted intersection point is behind the own vehicle VM. Specifically, the state that there is no predicted intersection point is a case in which, for example, the own vehicle VM passes by the target object in parallel. The state that the predicted intersection point is behind the own vehicle VM is a case in which the intersection point PI (xP, yP) where the predicted travelling direction of the own vehicle VM intersects with the predicted travelling direction of the target object is behind the rear end portion of the own vehicle VM (in the example shown in FIG. 8, the predicted intersection point is behind the own vehicle VM, thereby satisfying the first condition). On the contrary, the state that the first condition is not satisfied can be, for example, a case in which the intersection point PI is in front of the own vehicle VM. That is, a case in which the target object is predicted to travel in the direction toward the direction the own vehicle VM is heading and thus there is a risk of collision between the own vehicle VM and the target object.

Next, the second condition is that the lateral location of the target is within a predetermined range. Specifically, based on a processing result in step S411, the target determination section 23 determines whether the target TLN is located in the predetermined range in the coordinate system with its origin at the center PO. The predetermined range is, specifically, a hatched area to the left side of the own vehicle VM as shown in FIG. 8. In other words, the target determination section 23 determines whether the target TLN is present, in the coordinate system with its origin at the center PO, in an area between the straight line x=α and the straight line x=β(α>β).

The position of a starting line (x=α) of the hatched area (the predetermined range) shown in FIG. 8 is set a predetermined distance apart from the left side portion of the own vehicle VM. This is because when the own vehicle VM is extremely close to the target object, even if the first condition is satisfied it can be considered that there is a risk that the own vehicle VM may contact with the target object.

The predetermined distance is determined, for example, based on the width of a bicycle. In other words, the predetermined distance may be determined such that the own vehicle VM does not contact with the target object (a bicycle in the description of the present embodiment) for which a possibility of collision is determined, when the own vehicle VM is assumed to pass by the target object in parallel.

In the determination process performed by the target determination section 23 in the above step S412, the target object is regarded as a dot and the own vehicle VM is regarded as a figure (not as a dot, but an object having a certain width) having a predetermined size. Then, a risk of collision is determined accordingly.

When the first condition and the second condition are satisfied in step S412, the target determination section 23 makes an affirmative determination (YES), and proceeds the processing to step S413. The affirmative determination (YES) is made when a possibility is high that the radar device 1L has detected, for example, a bicycle which can safely pass by the own vehicle VM. In other words, in the process of step S412, the target determination section 23 determines whether the first condition that the target object is approaching toward the own vehicle VM without a risk of collision with the own vehicle VM, and the second condition that the target object is keeping some distance from the own vehicle VM, are satisfied. When the a result of the determination is affirmative, the target determination section 23 determines that there is a target object in the surrounding area of the own vehicle, and that although the target object is approaching the own vehicle VM, it is highly possible that the object is a bicycle which can safely pass by the own vehicle.

Then, the target determination section 23 increments the satisfied condition counter (step S413), and proceeds the processing to the following step S414.

In step S414, the target determination section 23 determines whether the number of satisfied conditions is greater than or equal to a threshold value. Then, when the number of satisfied conditions is greater than or equal to the threshold value (YES), the target determination section 23 determines that the target object is a bicycle which can safely pass by the own vehicle (step S415). The target determination section 23 outputs, to the collision determination section 24, information indicating that the target object detected by the left radar device 1L is a bicycle which can safely pass by the own vehicle. Then, the target determination section 23 proceeds the processing to the following step S418. In other words, the target determination section 23 determines that the target object is a bicycle when the number of affirmative determinations made by the target determination section 23 in the above step S414, that is, the number of times the target determination section 23 has determined that it is highly possible that the target object is a bicycle which is safely running, is greater than or equal to a certain number (greater than or equal to the threshold value). Consequently, whether the target object is a bicycle which can safely pass by the own vehicle VM, can be more accurately determined.

In this case, the target determination section 23 may further make a determination with reference to the target information IL for the speed of the target object. Specifically, based on the position information contained in the target information IL of the targets having been detected, the target determination section 23 predicts an absolute speed in the predicted travelling direction VD of the target object in accordance with an amount of change in the position of the respective detected targets in the coordinate system with its origin at the center PO of the rear axle. As a result, when a value of the absolute rate of the target object is lower than or equal to a value of the speed that a general bicycle can achieve, the target determination section 23 can more accurately determines that the target object is a bicycle. For example, in the above step S412, a condition that "an absolute rate of a target object is lower than or equal to a threshold value" may be added as a third condition. In other words, a determination may be made in step S412 based on the first condition and the third condition, or the determination may be made in step S412 based on the first condition, the second condition, and the third condition.

In step S415, the target determination section 23 determines that the target object detected by the left radar device 1L is a bicycle which can safely pass by the own vehicle. However, the target determination section 23 may determine, for example, that the target object is a pedestrian, a wheelchair, or the like. In other words, in the roadway environment in Japan where there is little possibility that another vehicle approaches an own vehicle VM from a left forward direction of the own vehicle VM, if the target object is to the left side of the own vehicle VM, and can safely pass by the own vehicle VM, the target determination section 23 may determine that the object is, not only a bicycle, a pedestrian, a wheelchair, or the like.

In this case also, the target determination section 23 may determine, based on the absolute speed of the target object, that the target object is a bicycle, a pedestrian, a wheelchair, or the like. In other words, a determination may be made based on general speeds of a bicycle, a pedestrian, a wheelchair, or the like as threshold values respectively. Consequently, the target determination section 23 can determine that, for example, the target detected by the left radar device 1L is a target object which can safely pass by the own vehicle, and may further determine the type of the target object, that is, whether the target object is a bicycle or a pedestrian.

On the other hand, when the a result of the determination in step S412 is negative (NO), if the satisfied condition counter is incremented, the target determination section 23 resets the counter to 0 (step S416). When the results of the determinations in step S412 and step S414 are negative (NO), the target determination section 23 outputs the target information IL to the collision determination section 24 (step S417). In other words, the case where the results of the determination in step S412 and step S414 are negative is a case in which there is a risk of collision between the target object and the own vehicle, or a case in which a possibility that the target object is a bicycle which can safely pass by the own vehicle VM is high but not certain. Thus, the collision determination section 24 determines, for example, whether there is a possibility of collision between the own vehicle VM and the target object based on the target information IL outputted from the target determination section 23.

When the collision determination section 24 has determined that there is a possibility of collision between the own vehicle VM and the target object and that collision cannot be avoided, the collision determination section 24 gives an instruction to the safety device 3 and cause the safety device 3 to take the above described safety measures.

In step S418, the target determination section 23 deletes the target information IL stored in the target information storage section 25, and proceeds the processing to the following step S419. Here, the target determination section 23 may delete all the target information IL stored in the target information storage section 25 (in such a case, the target information storage section 25 obtains at least M pieces of the target information iL from the start). Alternatively, the target determination section 23 may delete the target information IL stored in the target information storage section 25 starting from the oldest of all in chronological order.

In step S419, the target determination section 23 determines whether to end the processing. For example, the target determination section 23 ends the processing when the power of the vehicle control ECU 2 is turned OFF (for example, when the driver of the own vehicle VM has performed an operation for ending the process to cause the processes to be performed, or when the ignition switch of the own vehicle VM is turned OFF). On the other hand, when the target determination section 23 has determined to continue the processing, the target determination section 23 returns the processing to the above step S402 and repeats the processes.

In the above example, the target determination section 23 determines that the target object is a bicycle or the like which can safely pass by the own vehicle VM based on the predicted travelling direction and the lateral location of the target object. However, in another example, the target determination section 23 may determine that the target object is a bicycle or the like which can safely pass by the own vehicle VM based on a speed of the target object and a position where the target object is present. Specifically, the target determination section 23 may determine that the target object is a bicycle or the like which can safely pass by the own vehicle VM, when a value obtained by subtracting a running speed of the own vehicle VM from a relative speed of the target object with respect to the own vehicle VM is smaller than or equal to a predetermined value, and when a lateral location of the target object is within a predetermined range.

As described above, according to the present embodiment, when features (a position of presence, a moving direction, a speed) of the target object detected by the left radar device 1L satisfy the above conditions, it is determined the target object is unlikely to collide with the own vehicle VM. Accordingly, a determination of a risk of collision between the target object and the own vehicle can be omitted, thereby allowing appropriate safety measures to be taken. In other words, unnecessary operations which are caused because the radar device detects an object as a dot and assumes the detected dot is a size of an automobile, can be prevented.

In the above described example, the case of the roadway environment in Japan is assumed in which the left radar device 1L is taken as an example, and the vehicle control ECU 2 performs processing with respect to the target object detected by the left radar device 1L. However, the present invention is not limited thereto. It is understood that the above described processing is applicable, for example, also in a right-hand traffic environment where a bicycle, a pedestrian, or the like approaches the own vehicle VM from a right forward direction of the own vehicle VM. In other words, for example, the target determination section 23 may determine, based on the target information IR of the target obtained by the right radar device 1R, whether a lateral location of the target is within a predetermined range to the right side of the own vehicle VM; and perform the determination process in step S412.

The configurations described in the above described embodiment merely show specific examples, and do not limit the technical scope of the present invention. Any configuration may be applicable within the scope of the effect of the present invention.

Industrial Applicability

The object detection apparatus and the object detecting method according to the present invention are useful for a radar system for vehicles, which, with respect to an object detected by the radar device, takes into account the type of the object and appropriately determines whether a safety measures are required, thereby preventing unnecessary alarms or the like from being issued.

The invention claimed is:

1. An object detection apparatus which is mounted in a vehicle and detects an object in a surrounding area of the vehicle, the apparatus comprising:

a radar device which detects an object in the surrounding area of the vehicle as a dot;

a processing part which calculates, from a result of the detection as the dot by the radar device with respect to a target which is the object detected by the radar device, information indicating a relative position of the target relative to the vehicle, or information indicating the relative position of the target relative to the vehicle and at least one of a relative distance and a relative speed of the target relative to the vehicle, as target information;

a traveling direction prediction part which predicts a traveling direction of the vehicle, and predicts a traveling direction of the target based on the target information calculated by the processing part;

a determination part which determines, from the target information calculated by the processing part and the traveling direction of the target predicted by the traveling direction prediction part, whether a condition (i) that the relative position of the target indicated by the target information is within a set area which is set to a side strip at a lateral side of the vehicle and a condition (ii) that the traveling direction of the target predicted by the traveling direction prediction part is not a direction toward where the vehicle is heading are satisfied for each target, and which determines that the target is a movable body which does not collide with the vehicle when the conditions are satisfied; and a collision determination part which determines whether the target, that has been determined by the determination part as not being the movable body which does not collide with the vehicle, is likely to collide with the vehicle, wherein the determination part accumulates, each time the determination part has determined that the conditions are satisfied for the target, the number of times when the determination part has determined that the conditions are satisfied for the target and determines, when the accumulated number has reached a predetermined number, that the target is the movable body which does not collide with the vehicle, the travelling direction prediction part predicts the traveling direction of the target only when a predetermined number of chronological pieces of target information of the target are stored in a target information memory, and the processing part, the travelling direction prediction part, the determination part, and the collision determination part are executed by a computer.

2. The object detection apparatus according to claim 1, wherein the determination part predicts, based upon the target information, an absolute speed of the target of which the traveling direction is predicted by the traveling direction prediction part, and the determination part determines, when the determination part has determined that the conditions are satisfied and the absolute speed is less than or equal to a predetermined value, that the target is the movable body which does not collide with the vehicle.

3. The object detection apparatus according to claim 1, wherein the set area is set a first distance apart from a side portion of the vehicle at the lateral side of the vehicle.

4. The object detection apparatus according to claim 3, wherein the first distance is set in accordance with a width of the movable body.

5. The object detection apparatus according to claim 1, wherein the determination part transmits, when the determination part has determined that the target is the movable body which does not collide with the vehicle, the target information to the collision determination part, the target information being a criterion for determining to cause the collision determination part to perform, with respect to the target, at least one of the collision risk prevention operation and the collision damage reduction operation.

6. A non-transitory computer readable medium storing instructions which, when executed by a computer, cause the computer to perform an object detection method which is provided in a vehicle and detects an object in a surrounding area of the vehicle, the method comprising:
- a detection step of detecting an object in the surrounding area of the vehicle by using a radar device as a dot;
- a processing step of calculating, from a result of the detection as the dot by the radar device with respect to a target which is the object detected in the detection step, information indicating a relative position of the target relative to the vehicle, or information indicating the relative position of the target relative to the vehicle and at least one of a relative distance and a relative speed of the target relative to the vehicle as target information;
- a traveling direction prediction step of predicting a traveling direction of the vehicle, and predicting a traveling direction of the target based on the target information calculated by the processing part;
- a determination step of determining, from the target information calculated in the processing step and the traveling direction of the target predicted in the traveling direction prediction step, whether a condition (i) that the relative position of the object indicated by the target information is within a set area which is set to a side strip at a lateral side of the vehicle and a condition (ii) that the traveling direction of the target predicted in the traveling direction prediction step is not a direction toward where the vehicle is heading are satisfied for each target, and of determining that the target is a moveable body which does not collide with the vehicle when the conditions are satisfied; and
- a collision determining step of determining whether the target, that has been determined in the determining step as not being the movable body which does not collide with the vehicle, is likely to collide with the vehicle, wherein the determination step includes accumulating, each time it has been determined that the conditions are satisfied for the target, the number of times when it has been determined that the conditions are satisfied for the target and determining, when the accumulated number has reached a predetermined number, that the target is the movable body which does not collide with the vehicle, and the traveling direction prediction step includes predicting the traveling direction of the target only when a predetermined number of chronological pieces of target information of the target are stored in a target information memory.

* * * * *